United States Patent [19]

Herrmann

[11] Patent Number: 4,844,923

[45] Date of Patent: Jul. 4, 1989

[54] METHOD FOR REMOVING SERUM PROTEINS FROM MILK PRODUCTS

[76] Inventor: Martin Herrmann, Bussardhorst 32, D-3050 Wunstorf 1/ OT Luthe, Fed. Rep. of Germany

[21] Appl. No.: 133,019

[22] Filed: Dec. 15, 1987

Related U.S. Application Data

[63] Continuation of Ser. No. 807,994, Dec. 12, 1985, abandoned.

[30] Foreign Application Priority Data

Dec. 12, 1984 [DE] Fed. Rep. of Germany ....... 3445223

[51] Int. Cl.$^4$ .................. A23C 9/14; A23C 9/144; A23C 9/146
[52] U.S. Cl. .................... 426/239; 426/271; 426/330.2; 426/491; 426/495; 426/583
[58] Field of Search ............. 426/271, 34, 44, 42, 426/43, 580, 583, 495, 491, 239, 330.2

[56] References Cited

U.S. PATENT DOCUMENTS 3,423,208  1/1969  Kuipers .................. 426/271
4,138,501  2/1979  Chaveron et al. .................. 426/271

FOREIGN PATENT DOCUMENTS 2142812   2/1973  France .................. 426/271
2345939  10/1977  France .................. 426/271

*Primary Examiner*—Marianne Cintins
*Attorney, Agent, or Firm*—Allegretti & Witcoff, Ltd.

[57] ABSTRACT

A process for deproteinizing milk products, such as milk or whey, is disclosed. In connection with the steps of acidifying and heating the milk product, the milk product is also demineralized at least to some extent prior to the precipitation of the serum proteins. By means of this demineralization, a destabilization of the proteins is attained, allowing these serum proteins to be precipitated by acidification and heating. The milk products may be deproteinized in dependence upon the degree of demineralization, and the amount of serum protein can be reduced to approximately 0.2% or less. Also, partial or complete demineralization of milk proucts permits a lower acid proportion in the product by maintaining acidification at the same pH value. Reduced acidification time is also noted.

19 Claims, No Drawings

METHOD FOR REMOVING SERUM PROTEINS FROM MILK PRODUCTS

This is a continuation, of application Ser. No. 807,994, filed Dec. 12, 1985 now abandoned.

BACKGROUND OF THE INVENTION

1. Field of the Invention

The present invention relates to the removal of serum protein from milk products such as milk or whey.

2. Description of the Prior Art

It is well known in the art that serum protein may be precipitated from milk products such as milk or whey. Such known deproteinization processes usually include the steps of acidifying the milk product and heating the milk product such that serum protein is precipitated.

One problem with the prior art deproteinization processes is that serum protein contents of less than 0.2% are rarely achieved. Thus, there is a need for an improved process for removing serum protein from milk products that results in milk products having serum protein contents of approximately 0.2% or less.

SUMMARY OF THE INVENTION

It is an object of the present invention to provide a process for the deproteinization of milk products, such as milk or whey, that comprises the step of at least partially demineralizing the milk product prior to the precipitation of the albumin. It has been found that by removing at least a portion of the salt from the milk product prior to the deproteinization process, an improved yield of precipitated serum protein is achieved. In a preferred aspect of the present invention, the milk product is sufficiently demineralized such that the resulting deproteinized milk product contains less than approximately 0.2% serum protein.

Other specific objects and embodiments of the present invention will be made known in the following description of the preferred embodiments.

DESCRIPTION OF THE PREFERRED EMBODIMENTS

The inventive process is based on the desalting of milk or whey, whereby nearly 100% of the serum proteins, such as albumin, are denatured and precipitated by means of heating. It is known that the serum proteins, whether natural or denatured, are more nutritionally and physiologically important than caseins. For example, in comparison with caseins, the serum proteins have a higher nutritional value. The technological significance of the serum proteins is also known, as well as the fact that they denature at temperatures above 70° C. and form coprecipitates under such thermal treatment with caseins.

Minerals, such as sodium chloride, are usually present in milk products, either as bulk or trace elements. If the concentration of salt in milk or whey is increased, the salt ions compete (in high salt concentrations) with the proteins for water molecules such that the normal solubility of the proteins is decreased. Thus, proteins can be precipitated by the appropriate addition of salt. The addition of salt is used to analytically deproteinize milk samples.

My experiments have shown that the desalting of milk or whey apparently affects the stabilization of proteins. The salt content has a much greater significance for the stabilization of proteins than previously assumed. These experiments showed that in the demineralized milk product, serum protein is not stable when heated, as might be expected. In addition, coprecipitates (i.e., complex of caseins and serum proteins that form during heating) can be formed due to demineralization such that nearly 100% deproteinization is possible.

In the inventive process, the following variations are possible: the use of differing milk products including acidic whey, nonacidic whey or milk or mixtures thereof; various methods of desalting, including electrodialysis and ion exchanges; pH adjustments; variations in the degree and maintenance of heating and cooling; and various methods of separating the precipitated proteins from the deproteinized milk products.

During the following experiments, the samples were deproteinized with an centrifuge, filtered, and the whey removed from the thickened milk. Similar experiments with a separator manufactured by Westfalia, in which the precipitated serum protein was collected in the sediment area of the cylinder, yielded similar results such that the serum protein content in the whey was slightly higher.

EXAMPLE 1

An acidic whey with an serum protein content of 1% was heated for 10 minutes at 95° C., separated at 40° to 50° C. in an centrifuge, so that an serum protein content in the whey of 0.43% resulted. The acidic whey treated in that manner was desalted to various degrees between 0% and 80% by electrodialysis. After uniform heating and separation in an ultracentrifuge, the resulting whey yielded the serum protein values shown in Table I in dependence on the degree of demineralization.

TABLE I

| Degree of desalting | pH of the acidic whey | Serum protein content of the electrodialyzed, heated, and separated whey (%) |
|---|---|---|
| Original whey, not desalted (0%) | 4.35 | 0.43 |
| ↓ | 4.38 | 0.40 |
| ↓ | 4.40 | 0.36 |
| increasing degree of desalting | 4.46 | 0.32 |
| ↓ | 4.62 | 0.30 |
| ↓ | 4.98 | 0.29 |
| ↓ | 5.32 | 0.28 |
| Whey almost completely desalted (80%) | 5.36 | 0.25 |

From Table I, it can be seen that there is a correlation between the level of demineralization and the residual serum protein content of the heated and separated whey. The lower the mineral content of the whey, the lower is the serum protein content in the treated whey. It is further apparent from Table I that the desalting step has an influence on the pH. With increased desalting, the pH rose from 4.35 (starting salt content of the whey) to 5.36 (desalting level of about 80%).

EXAMPLE 2

Electrodialyzed milk, having a pH of 4.82 and an serum protein content of 0.60%, was mixed with 38% skim milk. The resulting mixture had a pH of 6.50 and an serum protein content pf 1.73%. This was heated and, by adding citric acid, the pH was adjusted to 4.5 at the heating temperature and times stated below in Table II. The resulting serum protein contents are also shown in Table II.

TABLE II

| Heating temperature (°C.) | Heat maintenance time (min.) | Serum protein content of the whey treated (%) |
|---|---|---|
| 90 | 5 | 0.193 |
| 90 | 15 | 0.175 |

EXAMPLE 3

Electrodialyzed whey was mixed with 20% skim milk. The pH of the mixture was 5.7 and the serum protein content was 1.165%. The mixture was heated, adjusted in a heated condition to a pH of 4.5, and the serum protein was then separated. The thermal treatment conditions and the resulting serum protein contents are shown below in Table III.

TABLE III

| Heating temperature (°C.) | Heat maintenance time (min.) | pH after heating | Serum protein content of treated whey |
|---|---|---|---|
| 90 | 5 | 5.60 | 0.212% |
| 90 | 15 | 5.70 | 0.137% |
| 90 | 30 | 5.75 | 0.205% |

The treatment of whey or milk can take place in such a manner that the milk is added to the whey before desalting, and the whey is desalted with the milk.

EXAMPLE 4

Electrodialyzed whey was adjusted, before heating, to a pH of 4.1 by means of citric acid. The whey was then heated and separated. The pH adjustment could also be carried out before desalting, such that the same pH is obtained after desalting. Table IV shows the thermal treatment conditions and the resulting serum protein contents.

TABLE IV

| Heating temperature (°C.) | Heat maintenance time (min.) | pH after heating | Serum protein content of treated whey |
|---|---|---|---|
| 90 | 5 | 4.5 | 0.120% |
| 90 | 15 | 4.6 | 0.190% |
| 90 | 30 | 4.6 | 0.161% |

EXAMPLE 5

Electrodialyzed whey with a pH of 4.82 and an serum protein content of 0.67 was heated and separated with the following results.

TABLE V

| Heating temperature (°C.) | Heat maintenance time (min.) | pH after heating | Serum protein content of treated whey |
|---|---|---|---|
| 90 | 5 | 5.2 | 0.124% |
| 90 | 15 | 5.1 | 0.151% |
| 90 | 30 | 5.0 | 0.124% |
| 95 | 5 | 5.4 | 0.141% |
| 95 | 15 | 5.3 | 0.166% |
| 95 | 30 | 5.2 | 0.125% |

The above examples show that the degree of demineralizing, the pH, the heating temperature, and the heating time all have an influence on the degree deproteinization of milk or whey. A further possibility in the desalting of milk consists of the general extraction of serum protein, whereby this extracted albumin can be marketed as a coprecipitate.

EXAMPLE 6

Milk is desalted by means of a suitable process, microbiologically acidified to a pH of between 4.0 to 5.2, or is adjusted to this pH level by means of the addition of an acid. The acidified milk is then heated to a temperature of above 80° C. in order to denature the serum proteins. The milk is then cooled and, by means of a suitable process, the precipitated serum protein is separated. Because of the coprecipitate formation that arises through heating, there occurs during the final separation process a nearly complete deproteinization of the milk or whey to values of approximately 0.2% or less, dependent upon the degree of demineralization.

According to the above examples, the deproteinization of milk or whey can take place through a partial or complete desalting in combination with a pH adjustment and/or a heating process. Preferably the heating takes place in the approximate isoelectrical pH range of the proteins to be separated.

EXAMPLE 7

Serum protein separated according to the inventive process was added to cream cheese. In comparison with a conventional UF-cream cheese produced fron nonacidic full concentrate, no bitter taste appeared in the cream cheese with the inventively processed serum protein during storage.

EXAMPLE 8

In connection with the production of cheese, milk is partially or completely desalted, heated to a temperature of between 90° to 95° C. and microbiologically acidified or thickened by means of acidification. The precipitated serum protein is then separated by a suitable process. The whey which thereby accumulates has, depending on the degree of desalting, an serum protein content of up to 0.2%. It is also possible to increase the dry materials content in the milk or whey in such a manner that either no or only a reduced quantity of whey precipitates.

A whey deproteinized and demineralized in accordance with the inventive process can be used for lactose production. Furthermore, drying can be carried out with other components without difficulties, since the adjustment of the pH in the absence of a buffer system is facilitated, as compared to a conventional acidic whey. A further advantage of the present invention is that skim milk or nonacidic whey can be acidified in a significantly shorter time because of the absence of a buffer system. In the case of an 80% demineralization of the original salt content, the acidification time amounted to only about 40% of the usual time.

EXAMPLE 9

Skim milk was demineralized and mixed, at 23° C., with the usual quantity of acidifying cultures. For acidification of up to a pH of 4.6, 8 hours were needed instead of 20. It was also shown that the level of demineralization during deproteinization determines the amount by which the acidification time is shortened. In other words, there is a direct relationship between the degree of demineralization and the acidification time.

The taste of milk products can also be improved through the use of the inventive process. The portion of the lactic acid formed for pH-reduction is significantly reduced, for example, in cream cheese and acidic milk products. Also the number of bacteria is reduced by the product's partially eliminated buffer system such that a lower product pH can be adjusted. Also, extended stability of the product was observed, without the product developing an acidic taste component. Thus, for example, acid milk in components and cream cheese, the sugar content of added fruit products can be reduced for obtaining the original sugar/acid ratio for the taste components.

Demineralization during the inventive process may be accomplished by electrodialysis, ionic exchange, chemical desalting, or through other known processes that are compatible with the milk products being treated. Electrodialysis is the preferred demineralization process.

The present invention for the deproteinization of milk (either curdled or noncurdled) or whey is based on process steps that include at least a partial demineralization of the starting product. By means of these process steps, a destabilization of the proteins is attained, such that the proteins are denatured at an acidic pH value and under thermal treatment. The denatured proteins can then be obtained by means of a separation process, whereby enhanced deproteinization occurs in dependence on the degree of desalting. Preferably, the serum protein content in milk or whey can be reduced by this process to approximately 0.2% or less.

It is further possible by means of the partial or complete desalting of milk or whey or other milk foods to achieve a low acid content in the product. This low acid content occurs using acidification at the same pH as a conventionally treated milk product that has not been partially or completely desalted. The resulting reduced acidification time due to the present invention, in addition to other advantages indicated above, is of particular interest.

It is to be understood that the present invention has been described in terms of certain preferred embodiments and objects. Additional embodiments and objects that may fall within the spirit and the scope of the present invention as claimed.

I hereby claim as my invention:

1. In a process for precipitating at least a portion of serum protein from a milk product including the steps of acidifying said milk product and heating said milk product such that said portion of serum protein is precipitated from said milk product, the improvement comprising the additional step of at least partially demineralizing said milk product prior to said precipitation of said portion of serum protein from said milk product, whereby an improved yield of precipitated serum protein is achieved and the residual serum protein content of said milk product after said portion of serum protein is precipitated from said milk product is less than approximately 0.2% by weight.

2. The process of claim 1 wherein said demineralization occurs prior to said acidifying and said heating steps.

3. The process of claim 1 wherein said acidifying step occurs prior to said heating step.

4. The process according to claim 1 wherein said acidifying step occurs subsequent to said heating step.

5. The process of claim 1 wherein said demineralization step occurs subsequent to said acidifying step and prior to said heating step.

6. The process of claim 1 wherein during said heating step, the pH of said milk product is approximately equal to the isoelectrical pH of said serum protein.

7. The process according to claim 1 wherein said milk product is selected from the group consisting of milk and whey.

8. The process according to claim 1 wherein milk or whey is added to said demineralized milk product.

9. The process according to claim 1 wherein said milk product has a pH of between approximately 3.5 and approximately 5.4.

10. The process according to claim 1 wherein subsequent to said heating step, said milk product is cooled prior to said precipitation of said portion of serum protein.

11. The process according to claim 10 wherein said milk product is cooled to a temperature of between approximately 20° C. and approximately 70° C.

12. The process according to claim 1 wherein said milk product is concentrated.

13. The process according to claim 12 wherein said milk product is concentrated to a degree of approximately 60% dry solids.

14. The process according to claim 1 wherein the acidification of said milk product is accomplished by means of the addition of acid.

15. The process according to claim 1 wherein said milk product is demineralized to an extent of about 80%.

16. The process according to claim 1 wherein said milk product is demineralized to an extent of up to approximately 80%.

17. The process according to claim 1 wherein said portion of serum protein is precipitated along with casein.

18. The process according to claim 1 wherein said acidifying step occurs during said demineralizing step.

19. The process according to claim 1 wherein said resulting milk product exhibits improved coprecipitate generation and stability.

* * * * *